Oct. 9, 1934.    G. M. REYNOLDS    1,976,268
RENEWABLE CUTTING EDGE FOR PLOWSHARES
Filed Oct. 13, 1933
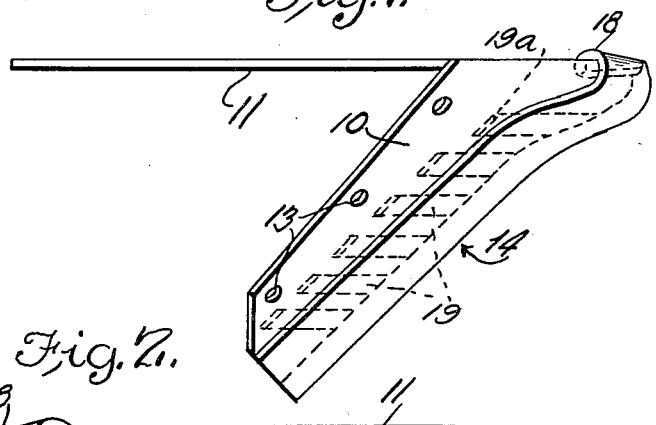
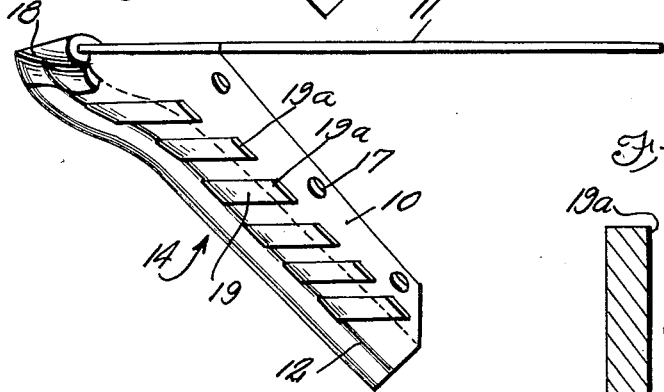
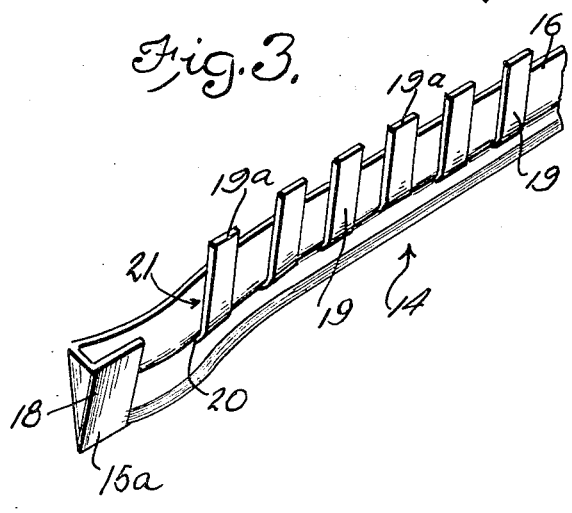
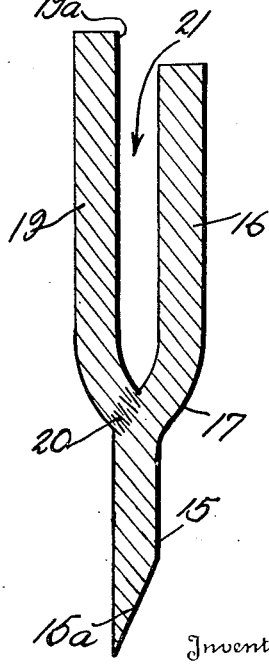
Inventor
George M. Reynolds.
By Bryant & Lowry
Attorneys Patented Oct. 9, 1934

1,976,268

UNITED STATES PATENT OFFICE 1,976,268

RENEWABLE CUTTING EDGE FOR PLOWSHARES

George M. Reynolds, Converse, Ind.

Application October 13, 1933, Serial No. 693,498

8 Claims. (Cl. 97—125)

This invention relates to certain new and useful improvements in renewable cutting edges for plow shares.

Renewable cutting edges for plow shares and the like disclose such constructions as a U-shaped attaching member forming a part of the renewable cutting edge or attaching fingers cut or struck out from the cutting edge, but in each instant, cutting edges heretofore employed have been constructed of a single piece of material such as steel that is tempered to the desired degree of hardness for retaining a cutting edge. It has been found, especially with renewable cutting edges having the attaching fingers formed of the same material as the cutting edge, that the attaching fingers subjected to the tempering process for treating the cutting edge crystallize at their junctures with the cutting edge with the junctures rendered highly fragile with the result that the attaching fingers are materially weakened and are subject to frequent breakage, the cutting edge then becoming detached from the plow share.

It is therefore the primary object of this invention to improve the construction of cutting edges for plow shares, especially the type employing attaching fingers for retaining the cutting edges positioned on the plow share, such improvements being accomplished by employing the usual carbon content of steel for the cutting edge that when tempered will retain the increased degree of hardness imparted thereto and to electrically weld attaching fingers to one side of the cutting edge with the attaching fingers possessing a lesser carbon content so that the tempering process to which the entire cutting edge including the attached fingers is subjected will be ineffective for destroying the inherent strength of the attaching fingers so that the latter remain rigid with the cutting edge during its entire life and until the cutting edge is normally worn away to the point of the attachment of the fingers with the cutting edge.

A further object of the invention is to provide a renewable cutting edge for plow shares of the foregoing character wherein the cutting edge comprising a plain bar is disposed at the forward or leading side of the plow share with the attaching finger disposed at the rear side of the plow share so that a minimum of resistance is offered to the plow in service.

A still further object of the invention is to provide a renewable cutting edge for plow shares wherein the attaching fingers are of a length to extend inwardly beyond the inner side of the cutting edge to act as a unit guide in the placement of the renewable cutting edge on the normal cutting edge of the plow share.

With the above and other objects in view that will become apparent as the nature of the invention is better understood, the same consists in the novel form, combination and arrangement of parts hereinafter more fully described, shown in the accompanying drawing and claimed.

In the drawing:—

Figure 1 is a top plan view of a plow share equipped with the renewable cutting edge of the present invention, showing the uninterrupted bar of the cutting edge at the leading side of the plow share and the attaching fingers at the under or rear side of the plow share;

Figure 2 is a bottom plan view of the plow share with renewable cutting edge attached thereto;

Figure 3 is a fragmentary perspective view of the renewable cutting edge showing the attaching fingers extending inwardly beyond the cutting edge to constitute a guide in the placement of the cutting edge on the plow share; and Figure 4 is a cross-sectional view of the renewable cutting edge showing a welded connection between the bar of the cutting edge and the attaching fingers.

Referring more in detail to the accompanying drawing which shows a preferred embodiment of the invention, the reference character 10 designates a plow share carrying the usual land sides 11, the share 10 being provided with the usual leading or cutting edge 12. For purposes of clarity, the mold board of the plow and other appurtenances have been omitted from the drawing, the reference character 13 designating openings in the upper rear edge of the plow share to facilitate the passage of hold-fast devices for the mold board.

The renewable cutting edge for the plow share is designated in general by the reference character 14 and includes a steel bar possessing relatively high carbon content enabling the same to be tempered to the desired degree of hardness and has a cutting edge per se 15 and a rear bar portion 16 with an intermediate slightly offset portion 17. The cutting edge is of a configuration to be received on and mate with the cutting edge 12 of the plow share 10, the nose of the cutting edge being reversely bent as at 18 to form an abutment nose of the forward leading corner edge of the plow share.

The renewable cutting edge is attached to the plow share by means of a series of fingers that cooperate with the bar portion 14 of the cutting edge as illustrated, the fingers 19 being formed of steel containing a relatively low carbon content and electrically welded as at 20 to the offset portion 17 of the cutting edge to cooperate with the bar portion 16 to form a pocket 21 that receives the cutting edge 12 of the plow share. The fingers 19 are arranged in spaced relation as illustrated and are engageable with the under or rear side of the plow share. To facilitate placement of the renewable cutting edge upon the cutting edge of the plow share, the fingers 19 extend outwardly beyond the inner edge of the bar portion 16 as at 19a so that the several ends 19a of the fingers may be engaged with the cutting edge 12 of the plow share for directing the renewable cutting edge 14 onto the plow share with the cutting edge of the latter received in the pocket 21. The renewable cutting edge is frictionally retained upon the plow share, the opposed faces of the bar portion 16 of the renewable cutting edge and the fingers 19 being normally parallel and spread apart in a wedging manner when engaged with the normally tapering opposite faces of the plow share 10. The abutment nose 18 at the forward leading edge of the renewable cutting edge prevents relative longitudinally shifting movement of the cutting edge upon the plow share.

In view of the relative difference of carbon content between the bar portion of the cutting edge and the attaching fingers 19, it is possible to subject the complete cutting edge comprising the bar and attaching fingers to a tempering process without in any manner weakening the holding characteristic of the fingers, such as by rendering them fragile or in weakening the electric weld connection between the fingers and bar. In other words, the tempering process to which the cutting edge is subjected is ineffective for weakening in any manner the attaching fingers 19 or their points of connection with the bar so that the renewable cutting edge presents a rigid and strong construction. The renewable cutting edge is self-sharpening in service, the bevelled edge 15a of the cutting edge 15 per se being on the drag side of the cutting edge. The principal features of this invention as hereinbefore stated include primarily the use of steel in the manufacture of the fingers 19 of a relatively low carbon content and the use of steel for the cutter bar portion of relatively high degree of carbon content so that when the cutting edge with the fingers 19 electrically welded thereto is subjected to a tempering process, the fingers are in no manner weakened and the renewable cutting edge may remain in service until the same wears away to the point of connection of the attaching fingers with the cutter bar. Novelty of the invention is also predicated upon the extension of the fingers 19 beyond the edge of the bar portion 16 to facilitate positioning of the cutting edge upon the plow share.

While the steel from which the cutting edge and fingers are constructed has been referred to as containing relatively different degrees of carbon, it is to be understood that manganese, vanadium, silica, chrome or other substance or alloys may be employed in the hardening of the cutting edge and reference to carbon as a hardening element is not to be construed in any limiting sense. Also, the fingers 19 may be secured in any suitable manner to the cutting edge by means or methods other than electric welding.

From the above detailed description of the invention, it is believed that the construction and use thereof will at once be apparent and while there is herein shown and described the preferred embodiment of the invention, it is nevertheless to be understood that minor changes may be made therein without departing from the spirit and scope of the invention as claimed.

I claim:—

1. A renewable cutting edge for earth working implements comprising an elongated body portion with uninterrupted longitudinal side edges and having a cutting edge and a single series of fingers attached to one side of the body portion intermediate the longitudinal side edges within the plane of the body portion for cooperation with the body portion for holding the cutting edge on an earth working implement.

2. A renewable cutting edge for earth working implements comprising an elongated body portion having a cutting edge and a single series of fingers attached to one side of the body portion for cooperation therewith in holding the cutting edge on an earth working implement, said fingers being electrically welded to the body portion, the body portion being formed of steel with relatively high carbon content and the fingers of steel of lesser carbon content whereby the strength of the fingers remains undisturbed when the cutting edge is subjected to a tempering process.

3. A renewable cutting edge for earth working implements comprising a body portion configurated to mate with the associated implement, and a single series of fingers attached to one side of the body portion intermediate opposite edges for cooperation therewith in holding the cutting edge on the implement, said fingers being electrically welded to the body portion, the body portion being formed of steel with relatively high carbon content and the fingers of steel of lesser carbon content whereby the strength of the fingers remains undisturbed when the cutting edge is subjected to a tempering process.

4. A renewable cutting edge for plow shares comprising an elongated bar adapted to overlap the forward side and cutting edge of a share, and attaching fingers secured to the rear side of the bar intermediate its cutting and rear edges to be located at the rear side of the share, said fingers being electrically welded to the bar, said bar and fingers possessing material characteristics whereby the inherent strength of the fingers remains undisturbed when the cutting edge is subjected to a tempering process.

5. A renewable cutting edge for plow shares comprising an elongated bar adapted to overlap the forward side and cutting edge of a share, and attaching fingers secured to the rear side of the bar intermediate its cutting and rear edges to be located at the rear side of the share, the bar and fingers being formed of steel with the fingers of lesser carbon content than the bar whereby the inherent strength of the fingers remains undisturbed when the cutting edge is subjected to a tempering process.

6. A renewable cutting edge for plow shares comprising an elongated bar adapted to overlap the forward side and cutting edge of a share, and attaching fingers secured to the rear side of the bar intermediate its cutting and rear edges to be located at the rear side of the share, said fingers being electrically welded to the bar, the bar and fingers being formed of steel with the fingers of lesser carbon content than the bar whereby the inherent strength of the fingers remains undisturbed when the cutting edge is subjected to a tempering process.

7. A renewable cutting edge for earth working implements comprising an elongated body portion having a cutting edge, and a single series of fingers attached to one side of the body portion for cooperation therewith in holding the cutting edge on an earth working implement, said fingers being welded to the body portion and the body portion being formed of steel capable of being hardened when subjected to a tempering process and the fingers being of steel of a character that assumes a lesser degree of hardness during the tempering whereby the fingers and thin welded connections with the body portion retain at least their original strength.

8. A renewable cutting edge for earth working implements comprising a body portion configurated to mate with the associated implement, and a single series of fingers attached to one side of the body portion intermediate opposite edges for cooperation therewith in holding the cutting edge on the implement, said fingers being welded to the body portion and the body portion being formed of steel capable of being hardened when subjected to a tempering process and the fingers being of steel of a character that assumes a lesser degree of hardness during the tempering whereby the fingers and thin welded connections with the body portion retain at least their original strength.

GEORGE M. REYNOLDS.